United States Patent Office.

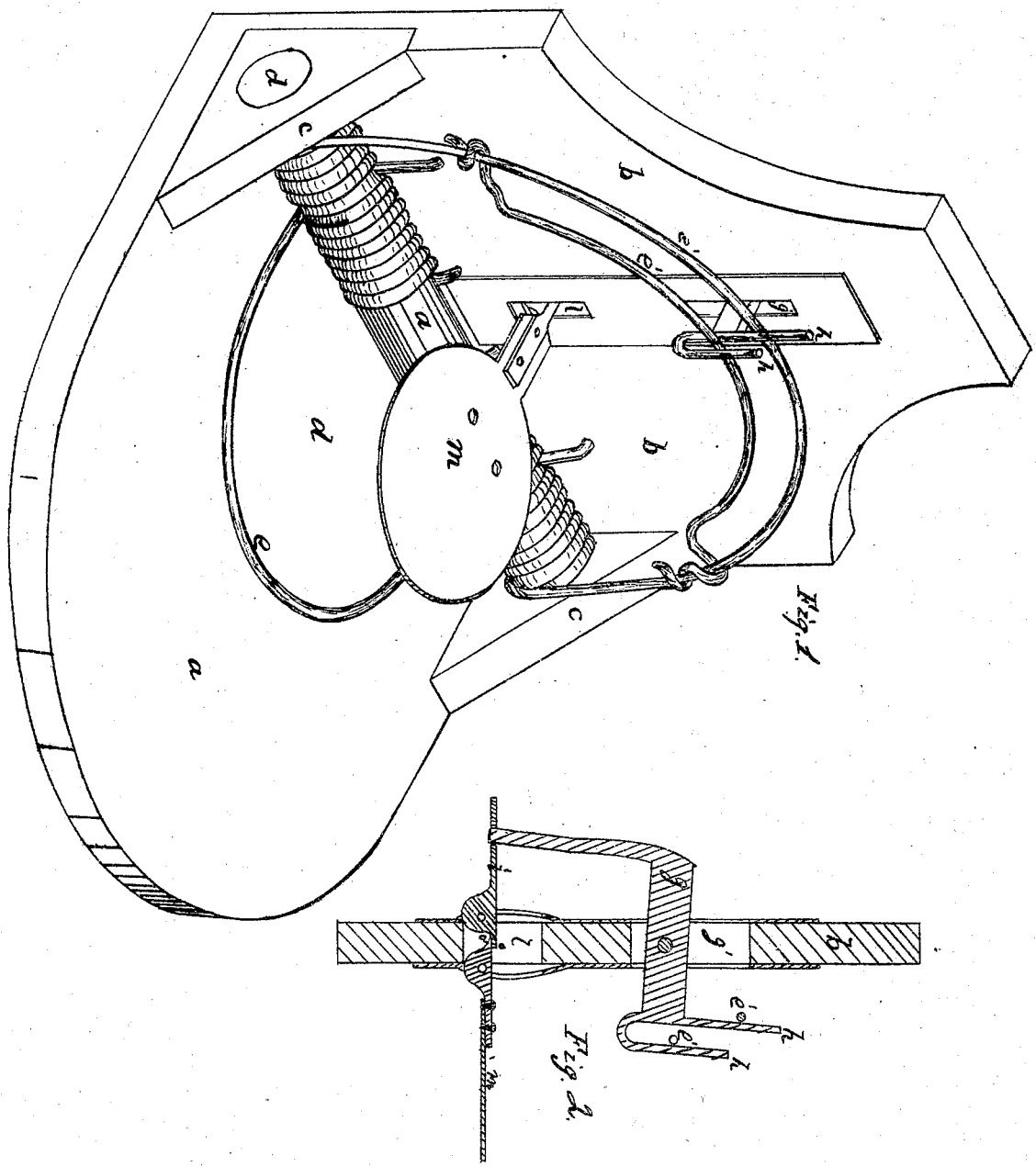

WILMER W. LEECH, OF PITTSBURG, PENNSYLVANIA, ASSIGNOR TO HIMSELF AND GEORGE COUTANT, OF SAME PLACE.

Letters Patent No. 74,762, dated February 25, 1868.

IMPROVED ANIMAL-TRAP.

The Schedule referred to in these Letters Patent and making part of the same.

TO ALL WHOM IT MAY CONCERN:

Be it known that I, WILMER W. LEECH, of the city of Pittsburg, in the county of Allegheny, and State of Pennsylvania, have invented a new and useful Improvement in Animal-Traps; and I do hereby declare the following to be a full, clear, and exact description thereof, reference being had to the accompanying drawing, making a part of this invention, in which—

Figure 1 is a perspective view of my improved trap, and

Figure 2 is a sectional view of the devices by which the trap is set and sprung.

Like letters of reference indicate like parts in each.

The nature of my invention consists in the arrangement and combination of a curved, bent, or hoop-shaped wire or wires, with ends coiled around a cylindrical bar, and rigidly attached to a fixed support, in connection with tripping-devices and bait.

To enable others skilled in the art to make and use my invention, I will proceed to describe its construction and mode of operation.

The frame consists of the floor $a$ and upright, $b$. The two are further connected by braces $c$, in which are inserted the ends of the cylindrical bar $d$. Around this bar $d$ are coiled the ends of the curved trap-wires $e$ $e'$, the extreme ends, however, being inserted in or otherwise secured to some part of the frame $a$ $b$. These trap-wires may be single, as at $e$, or double, as at $e'$, or the main wire may have several branches, if so preferred; the size and number being regulated by the size and variety of the animals to be caught. The coils are made in such way that the elasticity of the wire will bring the curved or bent part down with considerable force on to the floor $a$.

To set the trap, I use the devices shown in fig. 2: The trap-wires, $e$ or $e'$, are raised and passed over the hooks $h$, which are on the end of the bent lever $g$, passing through a slot, $g'$, in the upright, $b$, and pivoted therein. The lower and rear end of the bent lever $g$ is passed through a hole in the tripper $i$, which is brought to a horizontal position for that purpose. This tripper is pivoted in a slot, $l$, in the upright, $b$, and has a lip, $o$, at its forward end which catches on the lip $o'$ of the bait-pan $m$, which is pivoted in the same slot.

The bait is placed on the bait-pan $m$, and the trap is set. The upright, $b$, prevents the trap from being approached, except from the front. When the animal seizes the bait, or otherwise depresses the bait-pan $m$, the rear end of the tripper $i$ is lowered, the bent lever $g$ is released, the hooks $h$ swing forward and downward, and the trap-wires $e$ $e'$ fall instantly upon the animal, and hold it tightly to the floor $a$.

What I claim as my invention, and desire to secure by Letters Patent, is—

The curved or bent and coiled wires $e$ $e'$, one or more, single or double, in combination with the baiting and tripping-devices, constructed and arranged substantially as and for the purposes set forth.

In testimony whereof, I, the said WILMER W. LEECH, have hereunto set my hand.

W. W. LEECH.

Witnesses:
  A. S. NICHOLSON,
  G. H. CHRISTY.